(12) United States Patent
Giannoulis et al.

(10) Patent No.: US 12,335,773 B2
(45) Date of Patent: Jun. 17, 2025

(54) DEVICE AND METHOD FOR APPLICATION-REQUIREMENT AWARE MEDIUM ACCESS CONTROL

(71) Applicants: IMEC VZW, Leuven (BE); UNIVERSITEIT GENT, Ghent (BE)

(72) Inventors: Spilios Giannoulis, Leuven (BE); Irfan Jabandzic, Leuven (BE); Ingrid Moerman, Leuven (BE)

(73) Assignees: IMEC VZW, Leuven (BE); UNIVERSITEIT GENT, Ghent (BE)

( * ) Notice: Subject to any disclaimer, the term of this patent is extended or adjusted under 35 U.S.C. 154(b) by 532 days.

(21) Appl. No.: 17/635,959

(22) PCT Filed: Sep. 2, 2020

(86) PCT No.: PCT/EP2020/074496
§ 371 (c)(1),
(2) Date: Feb. 16, 2022

(87) PCT Pub. No.: WO2021/043841
PCT Pub. Date: Mar. 11, 2021

(65) Prior Publication Data
US 2022/0330082 A1    Oct. 13, 2022

(30) Foreign Application Priority Data
Sep. 3, 2019  (EP) ................... 19195071

(51) Int. Cl.
*H04W 28/02*   (2009.01)
*H04L 1/20*    (2006.01)
(Continued)

(52) U.S. Cl.
CPC ......... *H04W 28/0268* (2013.01); *H04L 1/20* (2013.01); *H04L 47/286* (2013.01); *H04W 72/543* (2023.01)

(58) Field of Classification Search
None
See application file for complete search history.

(56) References Cited

U.S. PATENT DOCUMENTS 9,525,641 B1 * 12/2016 Greene ............ H04N 21/25841
2007/0274320 A1   11/2007 Joshi et al.
(Continued)

FOREIGN PATENT DOCUMENTS

EP       3170290 A1    5/2017

OTHER PUBLICATIONS

International Search Report with Written Opinion from PCT Application No. PCT/EP2020/074496, Oct. 26, 2020.
(Continued)

*Primary Examiner* — Jason E Mattis
*Assistant Examiner* — Bao G Nguyen
(74) *Attorney, Agent, or Firm* — Workman Nydegger

(57) ABSTRACT

A device for medium access control in a node of a wireless communication network with time-shared medium includes a slot allocation module configured to allocate a timeslot for transmission from the node to a destination node over the time-shared medium; a validation module configured to validate a data packet before transmission to the destination node based on a latency requirement for the data packet, and an expected latency for the data packet based on the position in time of the timeslot, resulting in an approved data packet or a disapproved data packet; a scheduling module configured to schedule an approved data packet in the timeslot for transmission to the destination node.

13 Claims, 9 Drawing Sheets

(51) Int. Cl.
*H04L 47/28* (2022.01)
*H04W 72/543* (2023.01)

(56) References Cited

U.S. PATENT DOCUMENTS

| | | | | |
|---|---|---|---|---|
| 2008/0009289 | A1* | 1/2008 | Kashima | H04W 28/065 455/436 |
| 2012/0076103 | A1* | 3/2012 | Dai | H04L 5/0091 370/329 |
| 2012/0250678 | A1 | 10/2012 | Sabella et al. | |
| 2013/0128898 | A1* | 5/2013 | Kliger | H04B 7/212 370/442 |
| 2015/0244632 | A1 | 8/2015 | Katar et al. | |
| 2015/0282166 | A1* | 10/2015 | Zhao | H04W 28/021 370/336 |

OTHER PUBLICATIONS

Extended Search Report from corresponding EP Application No. 19195071.6, Jan. 24, 2020.

Lu et al., "A Time-Based Adaptive Retry Strategy for Video Streaming in 802.11 WLANs," Wireless Communications and Mobile Computing, vol. 7, No. 2, Jan. 23, 2007 pp. 187-203.

Suriyachai et al., "Time-Critical Data Delivery in Wireless Sensor Networks", 6th IEEE International Conference, Jun. 21-23, 2010, pp. 216-229.

Song et al., "An Efficient and QoS Supported Multichannel MAC Protocol for Vehicular Ad Hoc Networks" Sensors, vol. 17, No. 10, Oct. 9, 2017, 28 pages.

* cited by examiner

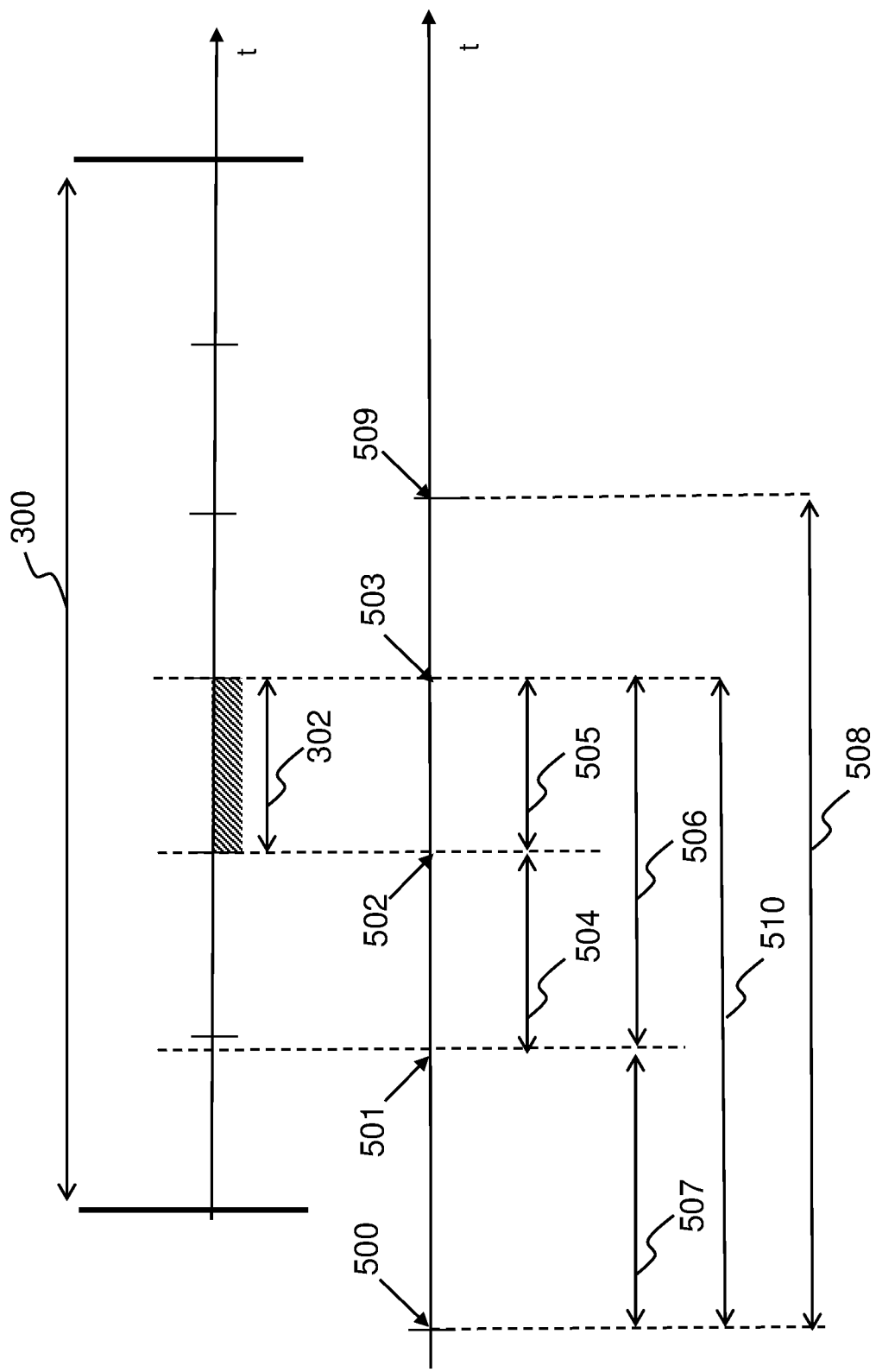

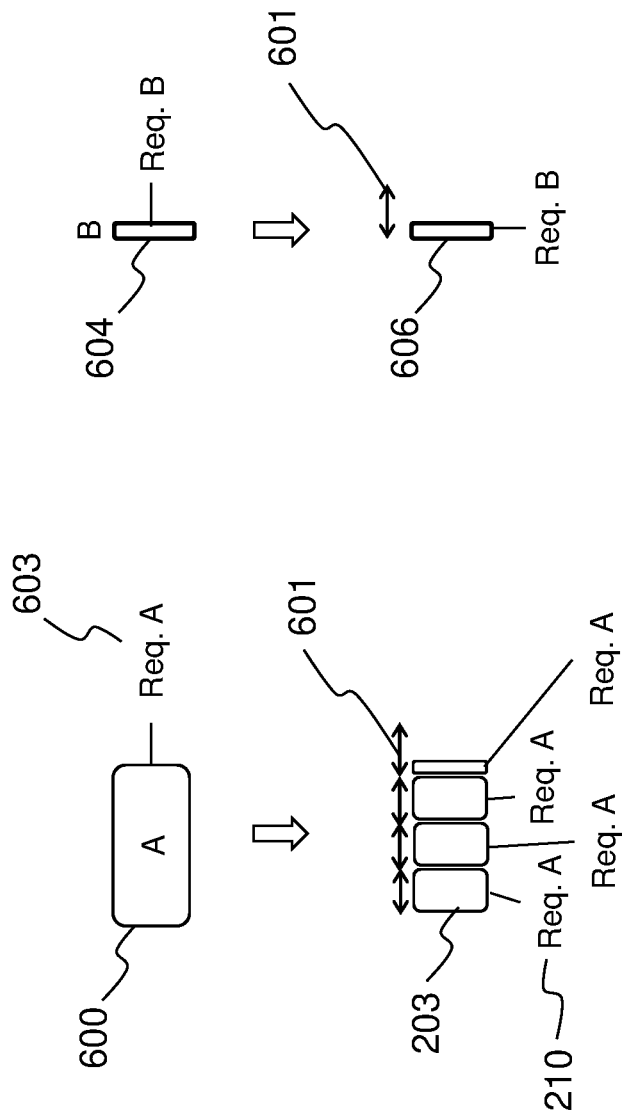

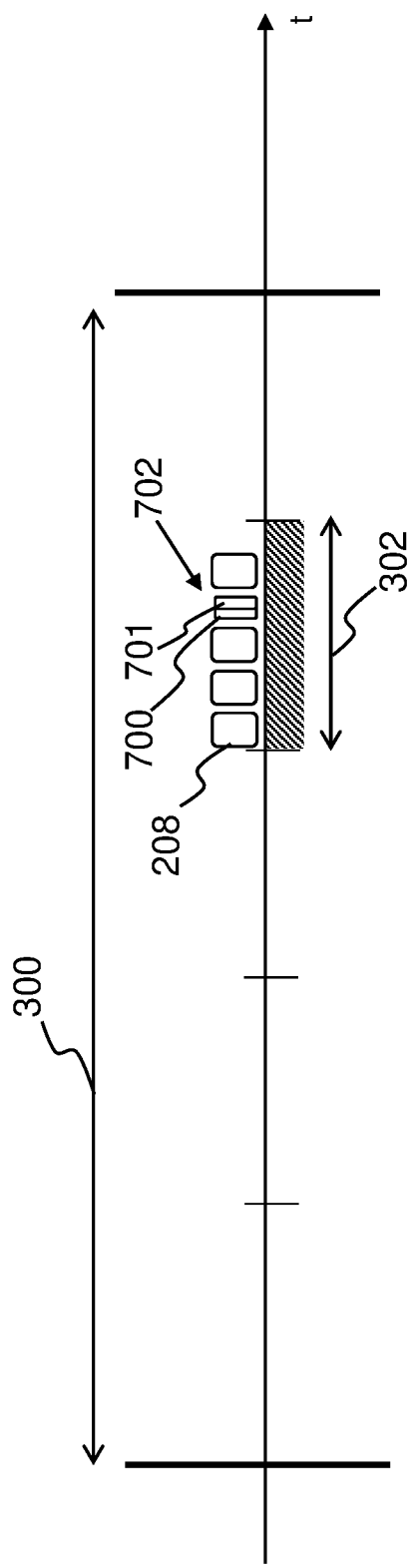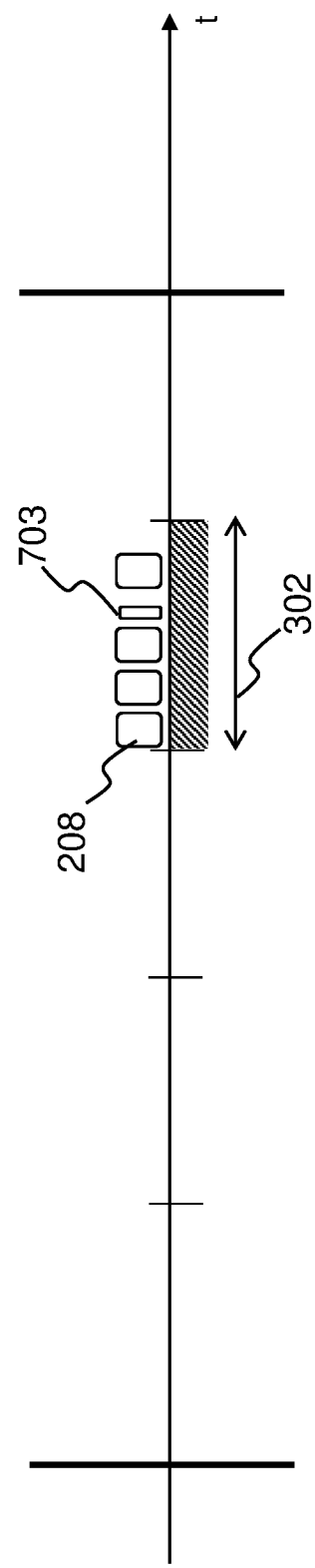

DEVICE AND METHOD FOR APPLICATION-REQUIREMENT AWARE MEDIUM ACCESS CONTROL

FIELD OF THE INVENTION

The present invention generally relates to the field of medium access control of communication networks using a shared medium. In particular, the invention relates to a Time Division Multiple Access solution that allows for application-requirement aware medium access control and optimal use of the available bandwidth.

BACKGROUND OF THE INVENTION

In a layered model for network communication, the MAC (Medium Access Control) layer is responsible for controlling how devices in a network gain access to a transfer medium, to manage the use of a shared medium by different users, and to control retransmissions in case of errors. Existing MAC protocols can be mainly categorized as either TDMA-based (Time Division Multiple Access) or contention-based. TDMA-based protocols allocate to a node an exclusive timeslot for communication, in which collision-free medium access is guaranteed. In contention-based protocols usually a station first senses the wireless channel to detect whether the channel is busy or idle, after which it backs off or transmits respectively.

In data communication over a network, different data packets may have different latency or reliability requirements. E.g., in vehicle ad hoc networks, safety applications (e.g. emergency brake) have more stringent requirements on reliability and real-time transmission compared to non-safety applications (e.g. infotainment). Another example is found in video streaming, where a reference frame used in inter-coding is more important than B and P frames. In most approaches, those requirements are only known at the application layer, such that the MAC protocol is not aware of any latency or reliability requirements regarding the data packets. For example, the 802.11 MAC specification is a contention-based medium access scheme where the retransmission process continues until a static retry limit is reached. In this, every data packet is treated the same way by the MAC protocol, which may result in a non-transmission or unacceptable delay of important packets.

Thus, there is a general need for MAC protocols being aware of application requirements.

Several solutions of application-aware MAC protocols have been proposed in the prior art. For example, "An Efficient and QoS Supported Multichannel MAC Protocol for Vehicular Ad Hoc Networks" by Song et al. (Sensors (Basel, Switzerland), vol. 17,10 2293, 9 Oct. 2017) discloses a QoS (Quality of Service) supported multichannel MAC protocol. The presented protocol uses a control channel to transmit control messages and the most important safety messages in a vehicular ad-hoc network. On the other hand, non-safety messages are transmitted over service channels, where differentiated QoS is reached by adapting the minimum contention window for different non-safety service classes according to traffic conditions. By taking into account the importance of data packets when assigning channels or timeslots, higher chance is created that important packets will be received (in time). However, scarce bandwidth may be wasted due to unneeded reservation of bandwidth for possible transmission of important packets and by transmitting delayed data packets not being useful anymore.

In the paper titled "A time-based adaptive retry strategy for video streaming in 802.11 WLANs" (Lu et al., Wireless Communications and Mobile Computing, 7(2), 187-203, 2007), a contention-based MAC protocol for wireless video streaming is presented. Unlike the conventional 802.11 MAC specification which discards a packet when a pre-defined, static retry limit is reached, the solution of this paper adaptively decides whether to discard or retransmit a packet based on a retransmission deadline attached to that packet. The MAC keeps retransmitting a packet as long as its retransmission deadline is later than the current time. Therefore, late packets are dropped at the sender without wasting network bandwidth. In this approach, the moment of deciding to drop a late data packet is taken at the latest possible moment, i.e. just before transmitting the packet. Such an approach works for a contention-based protocol, but in a TDMA-based protocol this would lead to late cancellation of reserved transmission time, which cannot be reallocated anymore and results in wasted bandwidth. Moreover, the solution presented in this paper only considers retransmissions, such that every data packet is transmitted at least once, even when it is late already. Finally, this solution only focusses on latency requirements. No reliability requirements are taken into account, which may result in a low rate of successfully transmitted packets, thereby not guaranteeing the reliability of the wireless link.

It is an objective of the present invention to disclose a device and method for medium access control, that resolves the above-described shortcomings of prior-art solutions. More particularly, it is an objective to present a TDMA-based solution that allows for application-requirement aware medium access control and optimal use of the available bandwidth.

SUMMARY OF THE INVENTION

According to a first aspect of the present invention, the above identified objectives are realised by a device for medium access control in a node of a communication network with time-shared medium, the device comprising:
  a slot allocation module configured to allocate a timeslot for transmission of a data flow from a node to a destination node over a time-shared medium;
  a validation module configured to validate a data packet comprised in the data flow before transmission to the destination node based on
    a latency requirement for the data packet, and
    an expected latency for the data packet based on the position in time of the timeslot,
  resulting in an approved data packet or a disapproved data packet;
  a scheduling module configured to schedule in the timeslot, a data packet comprised in the data flow and approved by the validation module, for transmission to the destination node,
and wherein the device is configured to drop a data packet comprised in the data flow and disapproved by the validation module, such that the disapproved data packet is not transmitted to the destination node.

Thus, the invention concerns a device for medium access control in a node of a communication network with time-shared medium. A communication network is a network comprising multiple nodes being configured to mutually communicate. Typically, the communication network is a wireless communication network, although the invention is not limited thereto. For wireless communication networks, the medium is limited to the available frequency spectrum, and large parts of the medium have been exclusively assigned by licencing to specific operators or technologies. For example, the communication network may be a wireless network using fixed infrastructure like networking hardware for access points. In another example, it may be an ad hoc wireless network, where no fixed infrastructure is used but each node participates in routing by forwarding data for other nodes. Optionally, the nodes of an ad hoc network may be mobile, meaning that nodes are free to move relatively to each other. Nodes may be e.g. vehicles, mobile devices like smartphones, robots, satellites, etc. Examples of ad hoc wireless networks are vehicular ad hoc networks, smart phone ad hoc networks, wireless mesh networks, wireless sensor networks, ad hoc networks of robots, disaster rescue ad hoc networks, etc. Every node of the communication network has one or more transceivers which may be working in full-duplex or half-duplex mode. In case of a wireless communication network, every node has the ability to communicate with other nodes within a certain range, due to the gradual attenuation of a transmitted wireless signal. Nodes being within the range of a specific node are defined as the neighbour nodes of that specific node. The neighbour nodes are able to receive signals directly from the specific node, and signals transmitted by the neighbour nodes can be received directly by the specific node.

A communication network with time-shared medium implies that the medium is used in common by the nodes of the network in a time-organized manner, i.e. different nodes using the medium at different times. One or more frequency channels may be available. The use over time of a specific channel has to be coordinated between various nodes being close to each other in order to avoid interferences. Typically, in a TDMA (Time Division Multiple Access) approach this coordination is done by defining a superframe comprising a number of timeslots, where the superframe is executed in a repetitive way. The various timeslots are assigned to different transmitters to allow them to transmit in rapid succession, one after the other, each of them using their own timeslot(s). In case of a wireless communication network, the medium refers to the available spectrum of frequency channel(s). It may refer to a licensed spectrum, like e.g. the licensed 4G/LTE frequency bands, an unlicensed spectrum, like e.g. Wi-Fi, or a combination of a licensed and unlicensed spectrum.

A device for medium access control refers to a device that implements a protocol controlling the access to the shared medium. When considering a layered model for network communication, e.g. the OSI model (Open Systems Interconnection model), such a device typically works in the MAC (Medium Access Control) layer. In this model, the first layer is the Physical layer, which is responsible for the transmission and reception of unstructured raw data between a device and a physical transmission medium. It converts the digital bits e.g. into electrical, radio, or optical signals. The second layer is the Data Link layer, which provides node-to-node data transfer and handles error correction from the Physical layer. The MAC layer is part of the Data Link layer and is responsible for controlling how users in the network gain access to the medium, including management of the use of a shared medium by different users. Typically, a layered model includes various other higher layers, where the Application layer is closest to the end user. Applications working at the Application layer interact with the users directly.

The medium access control may be done in a centralised way, where every node communicates with a central entity, or, in a preferred embodiment of the invention, in a distributed fashion. In the latter case, every node of the network has its own device configured to do the medium access control of that node, without having a central entity overseeing the overall network. This avoids that all control messages concerning slot and/or channel allocation have to be communicated with a central system, thereby limiting the overhead related to control, avoiding a single point-of-failure and leading to improved performance with regard to throughput, latency and energy consumption. Moreover, a node does not need any knowledge regarding its network membership or the network size, which makes the device suitable for large networks, for different network topologies and for networks whose size and/or topology change dynamically.

The device comprises a slot allocation module configured to allocate a timeslot for transmission from a node to a destination node over the time-shared medium. A destination node is a neighbour node of the node under consideration and the intended receiver of the data transmitted by that node. An allocated timeslot is a time interval that is exclusively reserved for a specific communication between two neighbour nodes, such that collision-free medium access is guaranteed. In a TDMA-based approach a timeslot is typically a time interval within the duration of a superframe, where the superframe is executed in a repetitive way. The timeslot duration, number of timeslots within the superframe and the duration of the superframe may vary according to various embodiments. In specific embodiments, the TDMA superframe may comprise multiple timeslots as well as multiple frequency channels, where a time-frequency slot needs to be allocated before starting transmission. In other embodiments, timeslots may be allocated without considering a superframe.

Various embodiments may use different types of protocols for the allocation of a timeslot. For example, a static allocation in a TDMA scheme may be used, or dynamic TDMA scheduling where timeslot usage is dynamically repurposed in function of the actual demands and topology of a wireless ad hoc network. Reservation of timeslots may be based on requests and received feedback from the destination node and/or other neighbour nodes. Typically, control messages are exchanged between nodes for making slot allocations. A separate control channel may be provided for the exchange of control messages, or specific control slots may be reserved within the TDMA scheme. Nodes may store the information about free and allocated slots themselves, e.g. by maintaining a table, or may collect this information from other nodes at the time of slot allocation.

A timeslot is allocated for a communication from one node to another, where this communication typically involves the transmission of multiple data packets. Typically, an allocated timeslot within a TDMA superframe remains allocated for the specific communication, as long as data packets are being transmitted from the node to the destination node. This implies that if not all data packets were transmitted during a first superframe execution, the transmission continues during the next superframe execution, using the same allocated timeslot. E.g., a timeslot may be released by a receiving node when the slot remains idle within a predefined period of time, indicating that communication between the transmitting and receiving node has ended. In another embodiment, a timeslot may be released by a transmitting node if the communication quality within that particular slot is low, e.g. shown by a high packet error rate. In an embodiment, multiple timeslots within the same TDMA superframe may be allocated for a transmission from a node to a destination node, e.g. when the required throughput is high or stringent latency or reliability requirements apply.

The device comprises a validation module configured to validate a data packet before transmission to the destination node. The data packet needs to be transmitted from the node under consideration to a particular destination node. A timeslot has been allocated for this transmission by the slot allocation module, and typically multiple of such data packets belonging to the same communication will be transmitted using this timeslot. A data packet is received by the device working at the MAC layer from a higher layer and is given by the device to the Physical layer for actual transmission. Validation of a data packet means that some check happens on a data packet before it is transmitted. The validation takes place before transmission, but not necessarily just before transmission. E.g. validation may take place at receipt of the data packet by the device or birth of the packet at the MAC layer. Moreover, another validation of the same data packet may be done, e.g. before retransmission or when the packet could not be transmitted during the current superframe.

The validation is based on a latency requirement and an expected latency for the data packet. A latency requirement of the data packet may involve a maximal allowed latency, i.e. the latest point in time at which the data packet needs to be transmitted from the node or received by the destination node. For example, a data packet containing infotainment data, or a weather forecast may be accorded a large allowed latency, as its time of receipt is not crucial. On the other hand, a critical safety message needs to be received almost in real-time. The latency requirement may be received by the device from a higher layer. For example, an application working in the Application layer may define specific latency requirements for different data packets.

The expected latency for the data packet is based on the position in time of the timeslot allocated for the specific transmission. In case multiple timeslots are allocated for the transmission, the first available timeslot may be considered. The position in time of the timeslot may e.g. be determined from the relative position of the timeslot within a superframe and the absolute position in time of the considered superframe. Estimating an expected latency implies that some prediction is done of when the data packet is likely to be transmitted by the node and received by the destination node. In various embodiments, different scenarios may be assumed. For example, it may be assumed that the data packet will be transmitted at the start of the allocated timeslot. In another embodiment, a worst-case scenario may be considered where the data packet is transmitted close to the end of the timeslot. Next, the expected latency may be determined by comparing the expected moment of transmission and/or receipt, with the time of birth of the data packet. Apart from the position in time of the timeslot, other time-based parameters may be taken into account to improve the estimation of the expected latency.

The validation module is configured to validate a data packet based on both the latency requirement for the data packet and the expected latency for the data packet. For example, the difference between the expected latency and the allowed latency may be calculated. Optionally, other additional requirements may be taken into account in the validation. In an embodiment, a reliability requirement, e.g. a Packet Error Rate requirement indicating a maximum allowed percentage of data packets that is not successfully received after transmission to the destination node, may be taken into account by the validation module. In another embodiment, a requirement indicating the importance that a data packet is received, irrespective if it is received in time or not, may be taken into account in the validation. In yet another embodiment, a maximum number of retransmissions may be taken into account. The outcome of the validation is a validation result, namely an approved data packet or a disapproved data packet. For example, a packet for which the expected latency is larger than the allowed latency may be disapproved, a packet for which the difference between the expected latency and the allowed latency is larger than a threshold may be disapproved, a data packet for which the maximum number of transmissions has been exceeded may be disapproved, etc.

The scheduling module is configured to schedule an approved data packet in the timeslot for transmission to the destination node. This implies that a data packet that was approved by the validation module, afterwards is scheduled by the scheduling module. Scheduling means that a specific moment of transmission, within the allocated timeslot, is assigned to the data packet. Multiple data packets, to be transmitted within the same communication, may be scheduled together, where some transmission sequence may be chosen. Possibly the scheduling of a data packet shows that no place is left for transmitting the data packet within the current superframe. In that case, the data packet may be accorded a transmission time within the allocated timeslot of the next superframe. Typically, the actual transmission of the scheduled data packets is done by the Physical layer.

Data packets being disapproved by the validation module are dropped, meaning that they are not scheduled by the scheduling module and not transmitted by the Physical layer.

Doing a validation of a data packet before transmission has the advantage that under scarce bandwidth conditions, only useful packets, i.e. those being approved by the validation module, are scheduled and transmitted. By not transmitting the disapproved packets, e.g. packets for which the latency requirement cannot be fulfilled anymore, no bandwidth is wasted for transmitting useless packets. This results in an improved throughput when bandwidth is scarce. Moreover, as bandwidth is used in the first place to transmit packets with stringent latency or reliability requirements, a higher chance of meeting those requirements is obtained. Furthermore, the estimation of an expected latency using the timeslot information results in early prediction of packets that will, at the expected transmission time, not be useful anymore. This allows for an early decision to drop packets, even at a moment when the latency deadline of a packet is not exceeded yet. Therefore, disapproved data packets are not taken into account anymore during scheduling, such that a timeslot can be optimally filled with packets that will effectively be transmitted. This results in an improved throughput as the available space within a timeslot is used to transmit only useful data. Finally, also a more optimal scheduling may be obtained, e.g. by looking for aggregation possibilities amongst the approved data packets.

Optionally, the device comprises an interface configured to receive one or more requirements, comprising the latency requirement, from an application. Thus, the device may receive only a latency requirement, or a latency requirement and one or more other QoS requirements, e.g. a Packet Error Rate requirement. The latency requirement for a data packet and possible other requirements are not defined by the device itself, working at the MAC layer, but is received from another layer, typically a higher layer, by means of an interface. For example, an application working at the Application layer may define such a requirement for a data packet, and may transmit it as metadata to the device, typically via other in-between layers. In another embodiment, QoS requirements may be exchanged per data flow comprising multiple data packets, using a cross-layer interface between the Application layer and the MAC layer. This has the advantage that a cross-layer design is obtained with a Quality of Service aware Medium Access Control.

Optionally, the validation module is configured to calculate the expected latency for a data packet based on the current lifetime of the data packet and the currently remaining time until start of the allocated timeslot. The current lifetime of a data packet may be calculated from the current time and a timestamp indicating birth of the data packet, e.g. when it was created by an application or received by the device. The currently remaining time until start of the allocated timeslot may be calculated from the current time and the position in time of the timeslot, e.g. derived from the relative position of the timeslot in a TDMA superframe and the position in time of the current superframe or the superframe wherein the data packet could be transmitted in view of already scheduled transmissions. The current lifetime of the data packet and the currently remaining time until start of the timeslot together determine the lifetime of the data packet at start of the timeslot, i.e. at the earliest transmission time. Optionally, also the timeslot duration and/or other time-based parameters may be taken into account for estimating the expected latency.

Further optionally, the latency requirement is a maximum allowed latency for the data packet, and the validation module is configured to validate the data packet by comparing the expected latency with the maximum allowed latency, resulting in an approved data packet if the expected latency is smaller than the maximum allowed latency, and otherwise resulting in a disapproved data packet. This implies that late data packets, i.e. those packets for which it will not be possible to transmit them before their maximal allowed latency has been exceeded, are disapproved.

Optionally, the validation module is configured to validate a data packet before retransmission based on the number of times the data packet was transmitted and a maximum allowed number of retransmissions for the data packet. If no successful acknowledgement from the destination node is obtained after a first transmission, a data packet may be retransmitted. For data packets without stringent latency requirements, this may lead to a high number of retransmissions. Therefore, the amount of times the same data packet is retransmitted may be limited, in order to prevent clogging of the spectrum due to continuous retransmission of the same data packets. The maximum allowed number of retransmissions may be a predefined static value or may be calculated in a more dynamic way, e.g. based on the current state of the TDMA scheme and/or the latency requirement. If the number of retransmissions of a data packet has reached a maximum allowed value, the data packet may be dropped. This contributes to an efficient use of the available spectrum.

Further optionally, the maximum allowed number of retransmissions for a data packet is based on the number of timeslots allocated for transmission from the node to the destination node and/or the latency requirement. This implies that the maximum allowed number of retransmissions is not based on a predetermined static value but is calculated in a more dynamic way. E.g., the actual state of the TDMA superframe may be considered, taking into account the number of timeslots within the superframe that has been allocated for the specific transmission. If more timeslots have been allocated for a specific transmission, a higher maximum number of retransmissions may be allowed for data packets being part of that transmission. If only one or a limited number of timeslots have been allocated for a specific transmission, a lower maximum number of retransmissions may be allowed, thereby avoiding that the limited available transmission time would only be used for retransmitting the same packets. This has the advantage that the use of bandwidth for retransmissions is adapted according to the number of timeslots available for a transmission. In another embodiment, the latency requirement for the data packet may be used to determine the maximum allowed number of retransmissions for the data packet. E.g., for a data packet with a stringent latency requirement, the allowed number of retransmissions may be strongly limited, while for a data packet where latency is not critical, a large number of retransmissions may be allowed.

Optionally, the requirements comprise a maximum allowed Packet Error Rate and the slot allocation module is configured to allocate an additional timeslot for transmission from a node to a destination node based on this maximum allowed Packet Error Rate and a monitored Packet Error Rate for the transmission. For example, a maximum allowed Packet Error Rate (PER) may be defined for a specific data flow, where this data flow comprises multiple data packets to be transmitted to a destination node. The maximum allowed PER e.g. is defined as the maximum allowed percentage of transmitted packets that is not successfully received by the destination node, irrespective of retransmissions were needed or not. The device may be configured to monitor a PER for this data flow. E.g., the number of successful acknowledgements received from the destination node may be counted, or the percentage of data packets that is disapproved and dropped by the validation module may be monitored. If, compared to the maximum allowed PER, a high monitored PER is obtained for the transmission, an additional timeslot may be allocated for that transmission. In an embodiment, multiple additional timeslots may be allocated. The allocation of one or more additional timeslots has the advantage that the link capacity is enlarged and therefore the chance of handling incoming traffic while succeeding the QoS requirements is improved. Moreover, the reliability of communication is increased, as a high PER due to unreliable spectrum conditions, e.g. external interferences, is countered by allocating additional slots.

Optionally, the slot allocation module is configured to allocate an additional timeslot for transmission from the node to the destination node based on the results of the validation module when validating multiple data packets before transmission to the destination node. For example, when validating multiple data packets being part of the same data flow, i.e. to be transmitted to the same destination node, the percentage of data packets that is disapproved and dropped by the validation module may be monitored. In an embodiment, the percentage of disapproved data packets may be compared with a PER requirement received for the data flow. In another embodiment, no such PER requirement is received by the device. Based on the obtained number of disapproved or dropped data packets, the validation module may trigger the slot allocation module to allocate one or more additional timeslots for that transmission. This has the advantage that results obtained from the validation module are used to optimize the TDMA scheme, thereby increasing the chance of handling incoming traffic while succeeding the QoS requirements.

Optionally, the scheduling module is configured to sequence data packets comprised in the data flow and approved by the validation module, according to their respective latency requirements and/or expected latencies. Sequencing data packets implies that an order is determined for transmitting data packets, e.g. data packets that will be transmitted during the same timeslot. Determining such an order may be based on the latency requirements and/or expected latencies of the data packets. Optionally, also other QoS requirements, like a maximum allowed Packet Error Rate, may be taken into account for sequencing. In this way, more urgent data packets, e.g. being closer to violation of their latency deadline, may be scheduled early in the sequence, thereby increasing the chance that they will be received in time by the destination node. This has the advantage that, besides the validation done by the validation module, also in the scheduling of data packets higher-layer requirements are taken into account. This results in an improved performance with regard to meeting those requirements.

Optionally, the validation module is configured to use the latency requirement and the position in time of the allocated timeslot to calculate a maximum allowed delay before scheduling the data packet for transmission. In some situations, it may be useful to postpone the scheduling of an approved data packet. For example, a small data packet may be stored in temporary buffer and wait for another small data packet to be aggregated with, before actual scheduling of the aggregated packet. The latency requirement of the data packet may e.g. show that the packet needs to be scheduled within the first available timeslot. Thus, the position in time of that timeslot shows how long the scheduling of the data packet can be delayed, e.g. just until the start of said timeslot. If its scheduling would be delayed longer, the first available timeslot will have passed, such that the data packet's latency requirement cannot be fulfilled anymore.

Further optionally, the scheduling module is configured to buffer a data packet before scheduling for transmission if the maximum allowed delay is larger than a predefined maximum buffer time, and to aggregate the data packet with another data packet when scheduling for transmission in the timeslot. Data packets of different sizes may be received by the device at the MAC layer. Typically, the Physical layer, responsible for the actual transmission, may define the size of a physical data packet, e.g. the amount of data that is transmitted per second by the Physical layer. Therefore, small data packets occurring at the MAC layer may be aggregated to obtain an aggregated packet with a size close to the packet size imposed by the Physical layer. This has the advantage that during transmission the available bandwidth will be maximally utilized, leading to an improved throughput. However, aggregation requires the availability of multiple small data packets at the MAC layer. Therefore, a small data packet not having an aggregation partner(s) yet, may be buffered first for some time, i.e. scheduling of the data packet is postponed. Such buffering is only allowed if it does not lead to violating the latency constraint of the data packet. A maximal buffer time is predefined, meaning that a data packet will remain in the buffer for maximally this amount of time. Therefore, buffering is only allowed if the maximum allowed delay before scheduling this data packet, as defined in the previous section, is larger than the predefined maximum buffer time. This has the advantage that aggregation can be used to obtain an improved throughput, but without the risk of violating latency constraints.

Optionally, the device is configured to receive a parent data packet from a higher layer, and to segment the parent data packet into data packets of a predefined maximum size comprising the data packet. A parent data packet is received by the device from a higher layer. On the other hand, a predefined maximum size may be imposed by e.g. the Physical layer. A parent data packet with size larger than the predefined maximum size needs therefore be segmented in smaller parts, before it is scheduled within a timeslot by the device at the MAC layer. After segmenting, the obtained data packets may each be validated and scheduled by the device. This has the advantage that the actual size of transmitting data packets at the Physical layer is taken into account when scheduling at the MAC layer.

Further optionally, the device is configured to assign the same latency requirement to each of the data packets originating from the parent data packet. This implies that after segmentation, each of the obtained data packets receives the latency requirement as defined by e.g. the Application layer for the parent data packet. This has the advantage that the device can validate each of the data packets separately, without violating the originally imposed requirement for the parent data packet.

Optionally, the device is configured to drop all of the data packets originating from the parent data packet if validation of one of the data packets by the validation module results in a disapproved data packet. For example, if a first data packet is late according to its latency requirement and will be dropped, all following data packets of the same origin will be late as well. This has the advantage that validation of other packets of the same origin can be skipped, and all packets originating from the same parent data packet are treated in the same way.

According to a second aspect of the present invention, the above identified objectives are realized by a method for medium access control in a node of a communication network with time-shared medium comprising:
  allocating a timeslot for transmission of a data flow from the node to a destination node over the time-shared medium;
  validating a data packet comprised in the data flow before transmission to the destination node based on
    a latency requirement for the data packet, and
    an expected latency for the data packet based on the position in time of the timeslot,
  resulting in an approved data packet or a disapproved data packet;
  scheduling in the timeslot, a data packet comprised in the data flow and being approved, for transmission to the destination node,
and wherein a data packet comprised in the data flow and being disapproved, is dropped, such that the disapproved data packet is not transmitted to the destination node.

According to a third aspect of the present invention the above identified objectives are realized by a computer program product comprising computer-executable instructions for causing a device to perform at least the following:
  allocating a timeslot for transmission of a data flow from the node to a destination node over the time-shared medium;
  validating a data packet comprised in the data flow before transmission to the destination node based on
    a latency requirement for the data packet, and
    an expected latency for the data packet based on the position in time of the timeslot,
  resulting in an approved data packet or a disapproved data packet;
  scheduling in the timeslot, a data packet comprised in the data flow and being approved, for transmission to the destination node,
and wherein a data packet comprised in the data flow and being disapproved, is dropped, such that the disapproved data packet is not transmitted to the destination node.

BRIEF DESCRIPTION OF THE DRAWINGS

FIG. 5 illustrates a calculation performed by the validation module, according to an embodiment of the invention.

FIG. 6a and FIG. 6b illustrate fragmentation of a data packet, according to an embodiment of the invention.

FIG. 7a and FIG. 7b respectively illustrate the aggregation of small data packets, and the scheduling of a small data packet without aggregation, both according to an embodiment of the invention.

DETAILED DESCRIPTION OF EMBODIMENT(S)

Figure 1:
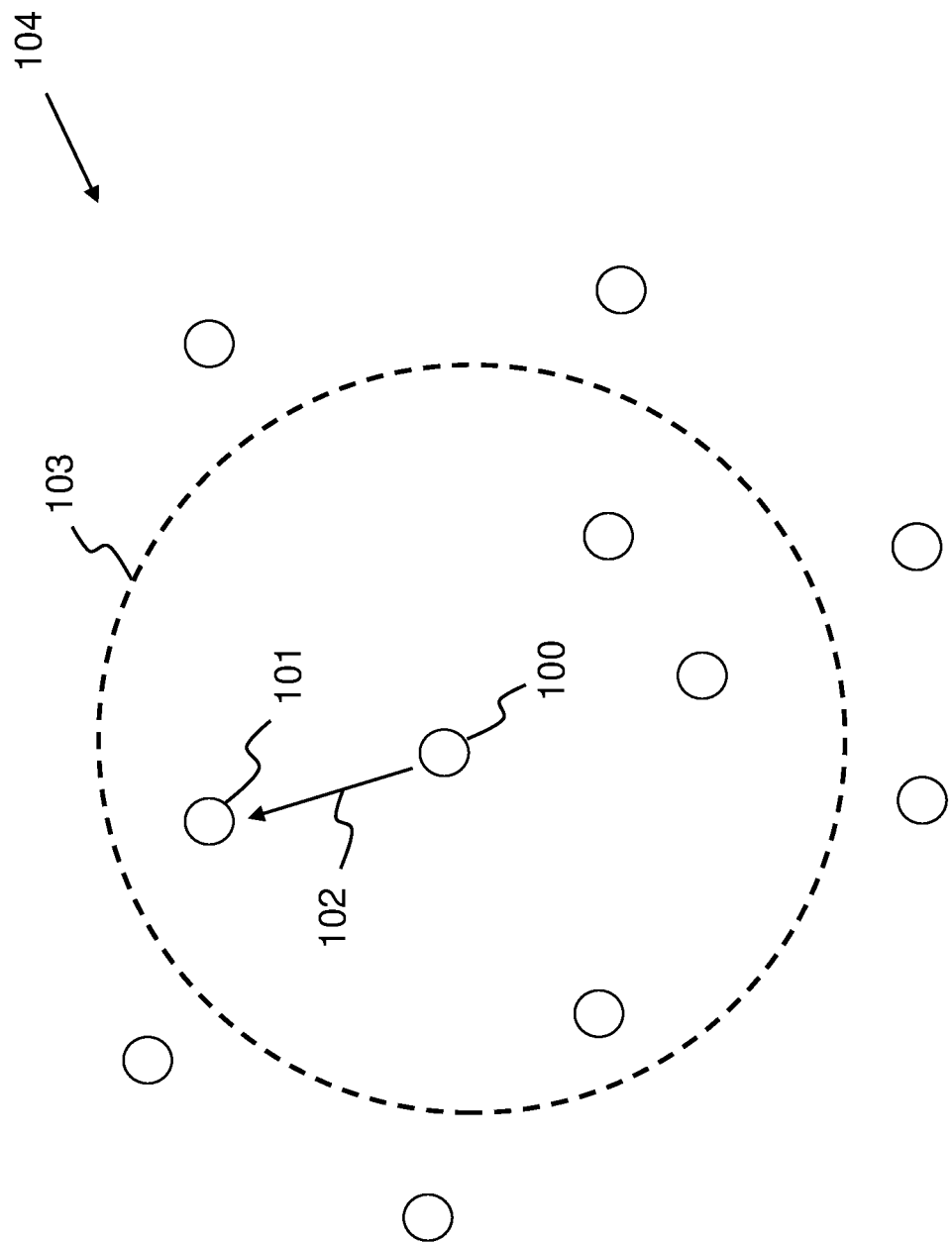
FIG. 1 gives a schematic view of a wireless communication network.

FIG. 1 gives a schematic representation of a wireless communication network 104, comprising nodes 100 and 101. The node 100 is able to communicate with its neighbour nodes 101, located within the range 103 of node 100. Other nodes are out of the range 103 of the node 100, and therefore cannot communicate directly with node 100. Every node 100, 101 of the wireless communication network 104 has one or more transceivers that may be working in full-duplex or half-duplex mode. FIG. 1 shows a transmission 102 from node 100 to destination node 101. The wireless communication network 104 makes use of a time-shared medium. The medium may refer to a licensed spectrum, like e.g. the licensed 4G/LTE frequency bands, an unlicensed spectrum, like e.g. Wi-Fi, or a combination of a licensed and unlicensed spectrum.

Figure 2:
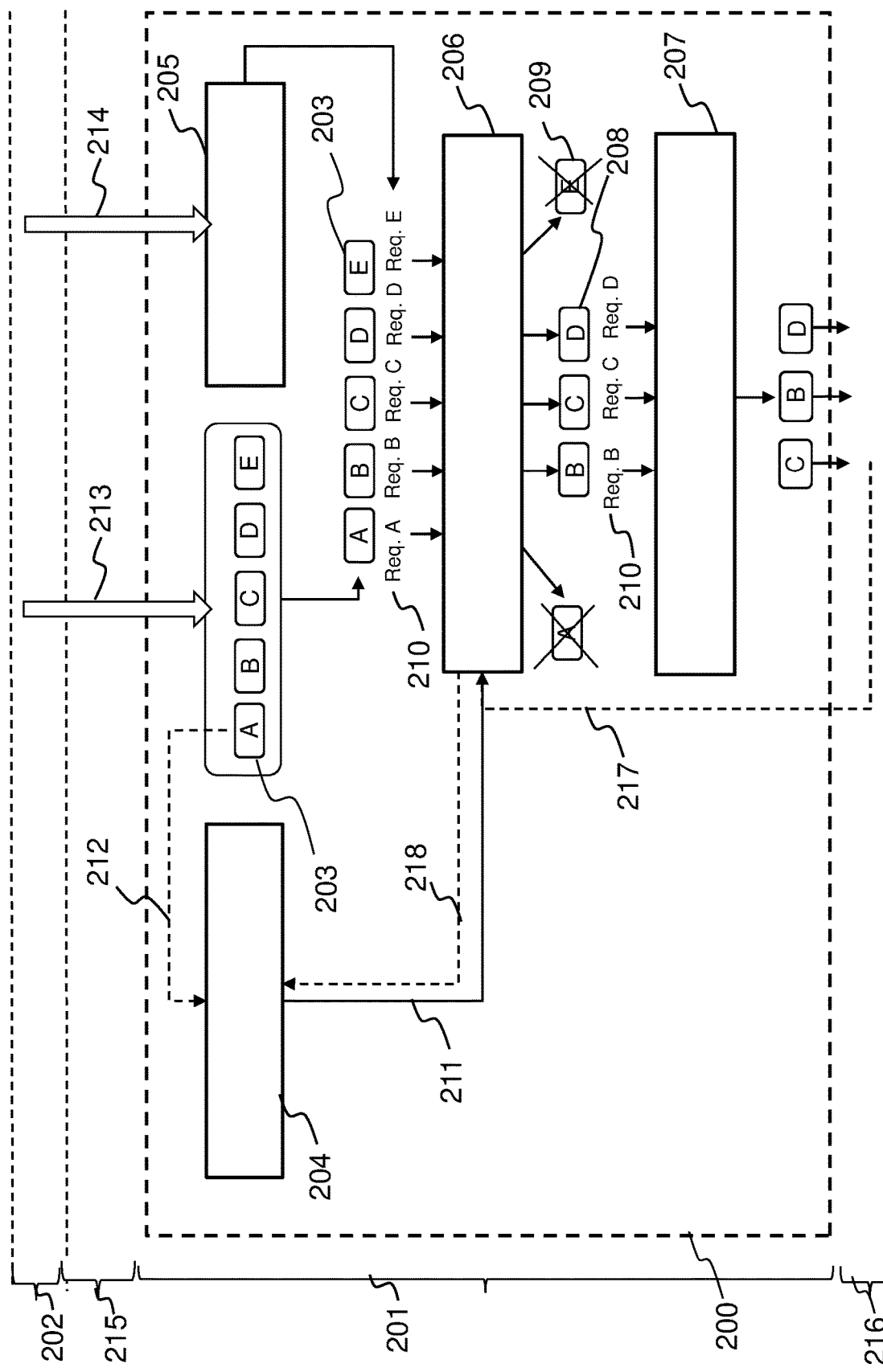
FIG. 2 gives a block scheme of the device according to an embodiment of the invention.

Medium access of a node 100 to the shared medium is managed by a device 200, which is schematically presented in FIG. 2. In a preferred embodiment, every node 100, 101 of the network 104 has its own device 200, such that medium access control is managed in a distributed way. The device 200 comprises a slot allocation module 204, a validation module 206 and a scheduling module 207. The device 200 is working at the MAC layer 201, and receives information from a higher layer 202, e.g. the Application layer. As shown in FIG. 2, this information is not received directly from the Application layer 202, but one or more intermediate layers 215 are available between the Application layer 202 and the MAC layer 201. For example, in the OSI model the Application layer 202 is followed by the Presentation layer, the Session layer, the Transport layer, the Network layer, the Data Link layer and the Physical layer 216, where the MAC layer 201 is part of the Data Link layer.

A data flow 213, to be transmitted from node 100 to destination node 101 is received by the device 200, resulting in data packets 203. The embodiment of FIG. 2 further shows a cross-layer API 205, configured to obtain QoS requirements 214 from the higher layer 202. The QoS requirements 214 comprise a latency requirement 210 for each data packet 203. Optionally, the QoS requirements 214 may comprise additional requirements, like a maximum allowed Packet Error Rate for the data flow 213.

The slot allocation module 204 is configured to allocate a timeslot 302 for the communication from node 100 to destination node 101. The allocation of a timeslot 302 is triggered by the receipt of a first data packet 203 by the device 200, as is indicated with 212 in the figure. Information 211 about the allocated timeslot 302, e.g. its position in time, is communicated to the validation module 206. The validation module 206 is configured to validate a data packet 203, based on a latency requirement 210 and an expected latency, where the latter is calculated using the timeslot information 211. This validation results in an approved data packet 208 or a disapproved data packet 209. Approved data packets 208 are transmitted to the scheduling module 207, while disapproved data packets 209 are dropped. The scheduling module 207 may determine a preferred order of transmission for the approved data packets 208, e.g. in FIG. 2 the packet indicated with 'C' will be transmitted first, although it was not received first by the device 200. After scheduling, the approved data packets 208 are transmitted at the Physical layer 216. If transmission of a data packet 208 is not successful, it is given back to the validation module 206, as is illustrated with 217 in the figure. There, it may be validated again before retransmission. Finally, the validation module 206 may trigger the slot allocation module 204 to allocate an additional timeslot, e.g. if validation shows that many data packets need to be dropped, see 218 in FIG. 2.

Figure 3:
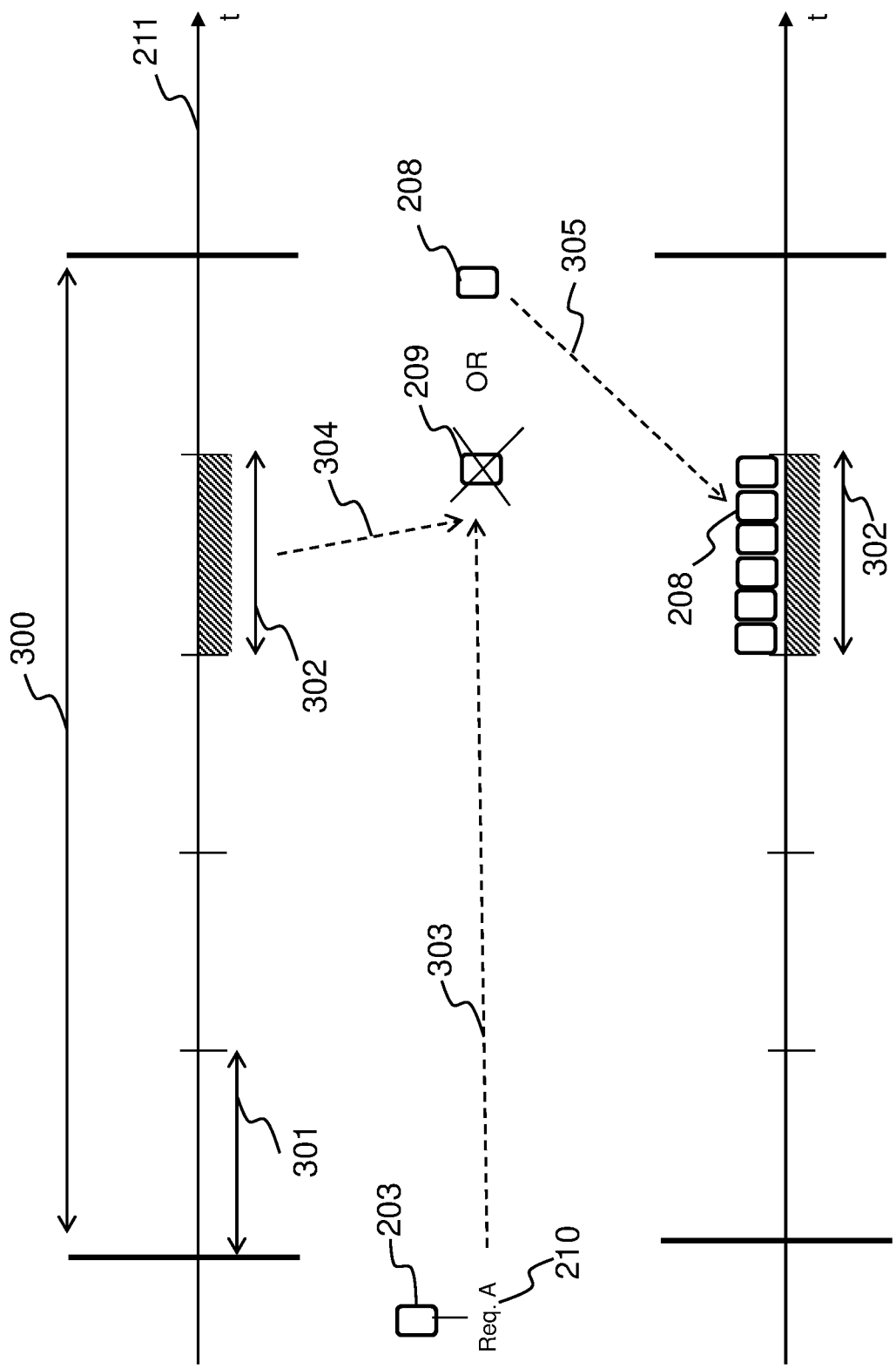
FIG. 3 illustrates slot allocation, validation and scheduling according to an embodiment of the invention.

The function of the slot allocation module 204, the validation module 206 and the scheduling module 207 is further illustrated in FIG. 3. FIG. 3 shows a timeline 211 and a superframe with duration 300. The superframe duration 300 comprises multiple timeslots 301. A timeslot 302 has been allocated for a specific communication from node 100 to destination node 101. Typically, within a TDMA-based approach, the superframe 300 is executed in a repetitive way, where the communication from node 100 to 101 continues each time the timeslot 302 is on turn. The timeslot duration and number of timeslots shown in FIG. 3 are merely schematic and may vary according to various embodiments. In specific embodiments, the TDMA superframe may comprise multiple timeslots 301 as well as multiple frequency channels, where a time-frequency slot needs to be allocated before starting transmission.

Various embodiments may use different types of protocols for the allocation of a timeslot 302. For example, a static allocation in a TDMA scheme may be used, or dynamic TDMA scheduling where timeslot usage is dynamically repurposed in function of the actual demands and topology of a wireless ad hoc network. Reservation of timeslots 301 may be based on requests and received feedback from the destination node 101 and/or other neighbour nodes. Typically, control messages are exchanged between nodes for making slot allocations. A separate control channel may be provided for the exchange of control messages, or specific control slots may be reserved within the TDMA scheme. Nodes 100 may store the information about free and allocated slots themselves, e.g. by maintaining a table, or may collect this information from other nodes at the time of slot allocation. In cases of high data traffic, it may happen that all of the timeslots 301 within the superframe 300 are in use already. In those cases, no timeslot 302 can be allocated immediately after receiving the first data packet, but the release of a timeslot by other nodes should be awaited.

FIG. 3 further shows a data packet 203, with latency requirement 210, e.g. a maximum allowed latency for packet 203. Latency requirement information 303 and the position in time 304 of the allocated timeslot 302 are used to validate the data packet 203. The timeslot information 304 may include, for example, the start time of the allocated timeslot 302 and its duration. The validation results in a disapproved data packet 209 or an approved data packet 208.

After approval, the data packet 208 is scheduled, see 305, within the timeslot 302. This implies that a specific transmission time for the data packet 208 is determined, typically taking into account other data packets that were approved and need to be transmitted within the timeslot 302. In embodiments, the scheduling module 207 is configured to sequence the data packets to be transmitted within the timeslot 302. This implies that a specific transmission order is determined, e.g. based on the latency requirements 210 and/or the remaining time until the latency deadline will be exceeded as may be calculated from the timeslot information 304. Optionally, other requirements, like a PER requirement may be taken into account for sequencing.

In the embodiment of FIG. 3, a disapproved data packet 209 is not scheduled within timeslot 302 and not transmitted. Therefore, no bandwidth is wasted for transmitting useless data packets 209 for which the latency requirement 210 cannot be met. In other embodiments, disapproved data packets may be handled otherwise. E.g. their actual scheduling and transmission may be postponed until a moment of low data traffic load.

Figure 4A:
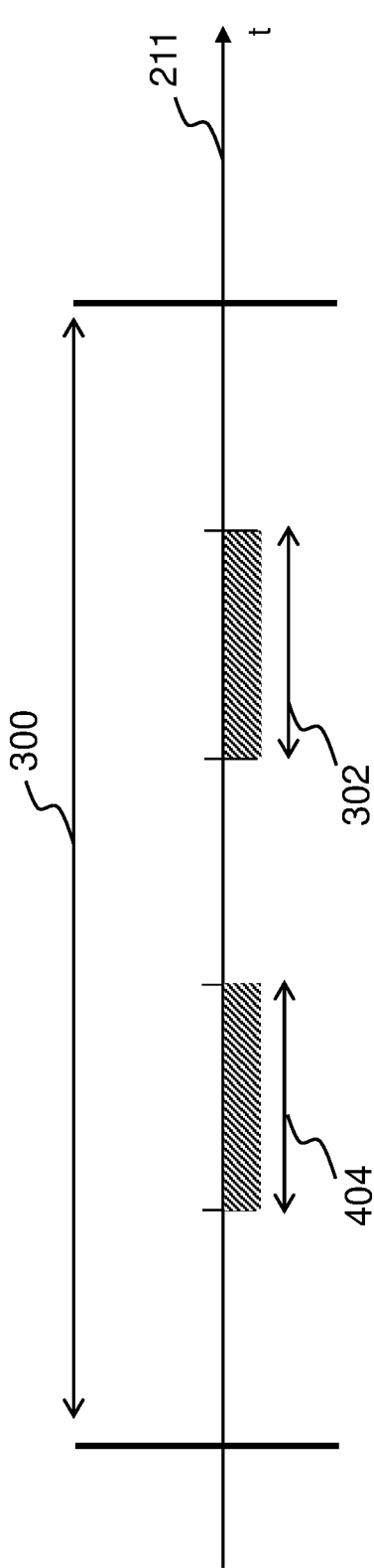
FIG. 4a and FIG. 4b illustrate respectively the allocation of multiple timeslots for the same transmission, and the scheduling of multiple data packets, both according to an embodiment of the invention.

In embodiments, multiple timeslots 404, 302, within the same superframe 300, may be allocated for a specific transmission from a node 100 to a destination node 101. This is illustrated in FIG. 4a. For example, the validation results obtained by the validation module 206 may act as a trigger for allocating one or more additional slots in a TDMA protocol that supports dynamic slot allocation. In case many data packets destined to a specific destination were dropped, e.g. detected by monitoring a packet error rate for the transmission, the device may trigger a request for new slots to be allocated to the specific destination. In this way, the link capacity is enlarged and therefore the chance of handling incoming traffic while succeeding the QoS requirements is improved. Thus, the device acts as an enabler to match spectrum usage to incoming data load.

Figure 4B:
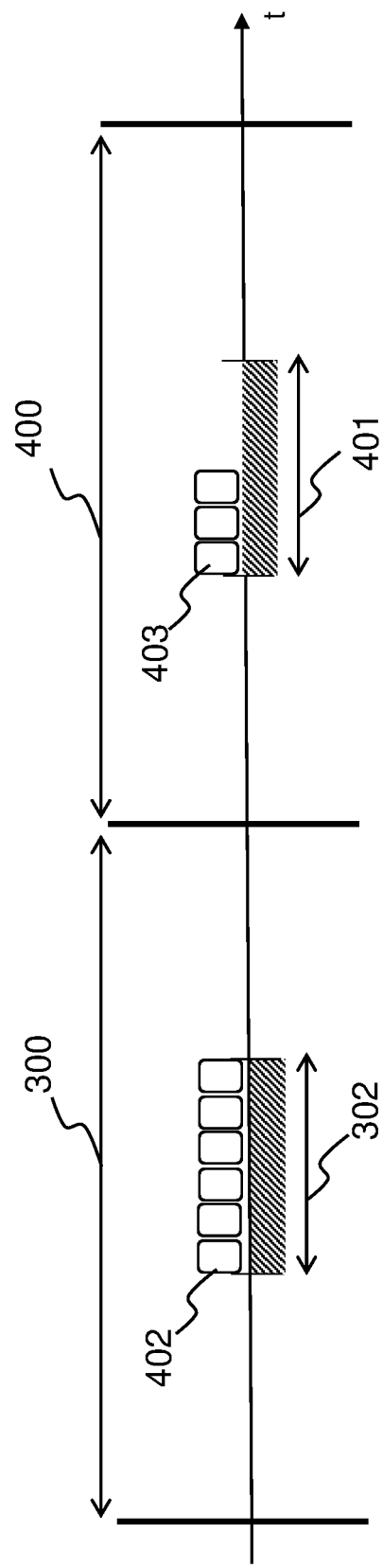

In embodiments, it may occur that not all of the approved data packets 208 fit into a single timeslot 302. This is illustrated in FIG. 4b. In that case, a number of data packets 402 will be scheduled within the timeslot 302 of the current superframe 300, while the remaining data packets 403 will be scheduled within the timeslot 401 of the next superframe 400. Before scheduling within the next superframe, the remaining data packets 403 are validated again by the validation module 206. For example, they may be validated again with regard to their latency requirement 210 at the start of the next superframe 400, or validation may be done at the end of every timeslot. Data packets 403 that were originally approved for scheduling within timeslot 302, but could not be scheduled within the timeslot 302, may be disapproved later on because a transmission within timeslot 401 would lead to a violation of the latency requirement 210.

In an embodiment, depending on the data rate from the Application layer 202, a timeslot 302 can be fully or partially filed. In case that there are not enough data packets 208 available to completely fill the slot 302, the device 200 may periodically check during execution of the timeslot 302 whether new packets were received and successfully validated. If that is the case, those newly generated packets may be scheduled as well.

FIG. 5 illustrates how the validation of a data packet 203 may be done, according to an embodiment of the invention. FIG. 5 gives a case where the data packet 210 is approved. The timestamp 500 indicates the time of birth of a data packet 210, e.g. the time it was received by the device 200 or created in the Application layer 202. The timestamp 501 represents the current time, i.e. 'now'. The timeslot 302, with duration 505, a start time 502 and an end time 503, has been allocated for the specific transmission. The time duration 508 represents the maximum allowed latency, as given in the latency requirement 210 for the data packet 203. Starting from the time of birth 500, the data packet 203 should arrive at the destination node 101 at the latest at time 509. The time duration 507, between time of birth 500 and the current time 501, is the current lifetime of the data packet 203. The time duration 504 is the remaining time until start of the timeslot 302. Time duration 506, being the addition of time duration 504 and the timeslot duration 505, is the remaining time until end of the timeslot 302. In a best-case scenario, the data packet 210 may be transmitted close to the start time 502 of the slot 302. In a worst-case scenario, the data packet 210 may be transmitted close to the end time 503 of the timeslot 302. In the worst-case scenario, the time duration 506 may be considered as the remaining time until the packet 203 will reach its destination. Therefore, the expected latency 510 of the data packet 203 may be calculated as the addition of the current lifetime 507 and the remaining time to the destination 506. FIG. 5 shows that, for the considered data packet 210, the expected latency 510 is smaller than the maximally allowed latency 508, and therefore the data packet may be approved.

In another embodiment, additional time-based parameters may be taken into account for calculating the remaining time until the packet 203 will reach its destination. E.g. a processing time within the Physical layer 216 and/or a queueing delay between layers may be taken into account. Moreover, in embodiments, another scenario than the aforementioned worst-case scenario may be considered, e.g. where it is assumed that data packet 203 will be transmitted close to the start time 502 of the timeslot 302, or half-way the timeslot 302. This results in a higher risk that non-useful data packets 203 are transmitted instead of being dropped, because in reality they were sent e.g. close to the end of the timeslot 302. On the other hand, assuming the worst-case scenario for validation results in a larger chance of dropping a data packet 203 that would have arrived at time.

The validation as illustrated in FIG. 5 may be done for each data packet 203 to be transmitted for the first time. In case no successful acknowledgement from the receiver is obtained after a first transmission, the data packet 203 may be retransmitted. In an embodiment, a validation in function of the latency requirement 210 using an approach like described above may be applied before retransmission. If at the current time the expected latency for the retransmitted data packet is still lower than the maximally allowed latency, the data packet is approved for retransmission. Otherwise, it may be dropped.

Moreover, in an embodiment, the number of retransmissions of a specific data packet 203 may be monitored and compared with a maximum allowed number of retransmissions. The latter may be statically defined, being the same for every data packet, or may dynamically be calculated. In an embodiment, the maximum allowed number of retransmissions is calculated as the ratio of 'A' and 'B'. 'A' represents the remaining time until the maximum allowed latency is reached and may be calculated by subtracting the current lifetime 507 and the timeslot duration 505 from the maximally allowed latency 508, see FIG. 5. 'B' represents an average retransmission delay, which may be calculated as a ratio of the superframe duration 300 and the number of timeslots 302 being allocated for the transmission. The calculated result may be capped to a predefined maximum. In this way, when many timeslots 302 are allocated for the transmission or the maximum allowed latency is high, the maximally allowed number of retransmissions is high and capped to the predefined maximum. When less timeslots 302 are allocated for the transmission or the maximum allowed latency is low, the maximally allowed number of retransmissions will be lower than the predefined maximum.

In another embodiment, additional QoS requirements 214, apart from the latency requirements 210, may be received by the device 200. For example, a reliability requirement in the form of a maximally allowed Packet Error Rate (PER) may be used by the device 200. Moreover, the device 200 may be configured to monitor the actual Packet Error Rate for a specific transmission. A PER is the percentage of transmitted packets that is not successfully received by the destination node 101, irrespective whether retransmission(s) were needed or not. It may be monitored e.g. by counting the number of successful acknowledgements by the receiver, or by counting the number of disapproved or dropped data packets by the validation module 206. When many retransmissions are allowed, e.g. for data flows allowing larger latencies, the monitored PER will be low as not many packets are dropped by the validation module 206. However, in other cases, where the validation module 206 needs to drop many packets, the monitored PER may reach the maximally allowed PER. In such a case, various actions may be triggered by the device 200. For example, an additional timeslot 302 may be allocated by the allocation module 206 for that transmission. Accordingly, a dynamically calculated maximum allowed number of retransmissions, as described above, will increase, leading to a decrease in the number of dropped packets. A second action may be to allow for more retransmissions for the specific data flow. A third action may be to adapt parameters at the Physical layer, e.g. reduce the MCS value (Modulation and Coding Scheme) to increase the likelihood of successful transmissions.

In an embodiment, the device 200 may be configured to fragment a data packet, as is illustrated in FIG. 6a. The Physical layer, responsible for the actual transmission, may impose a maximum size 601 of a transmitted data packet. That maximum size 601 may depend on the actual running mode of the Physical layer, based on the link status or link quality to the destination node. Accordingly, data packets 203 handled by the device 200 at the MAC layer may not be larger than a predefined maximum size 601. When a parent data packet 600 is received by the device 200, e.g. from the Application layer, the parent data packet 600 is fragmented into data packets 203, which will further be validated and scheduled by the device 200. As is illustrated in FIG. 6a, the latency requirement 603 as received from the higher layer 202 for the parent data packet 600, is assigned as an individual latency requirement 210 to each of the resulting data packets 203. In this way violation of the latency requirement 603 at the Application level is avoided. Moreover, all of the data packets 203 originating from the same parent data packet 600 may be dropped if validation of one of said data packets 203 results in a disapproved data packet. In this way, a large parent data packet 600 is either dropped or transmitted as a whole.

FIG. 6b shows that a small data packet 604 may be received from the higher layer 202. As the data packet 604 is smaller than the predefined maximum size 601, no fragmentation is needed, and a small data packet 606 will be validated and scheduled by the device 200. Alternatively, a small data packet 606 may occur as a small remaining part from fragmenting a large parent data packet 601.

A small data packet 606 may be aggregated with another small data packet during scheduling. This is illustrated in FIG. 7a, where two small data packets 700 and 701 are aggregated to form an aggregated data packet 702, that is scheduled within the allocated timeslot 302. In an embodiment, a small data packet 700 is not scheduled immediately, but first pushed to a buffer where more packets are waiting to be aggregated. When enough data packets are available in the buffer, an aggregated data packet 702 is formed that is ready to be sent to the destination. Typically, the size of an aggregated data packet 702 is smaller than but close to a maximum predefined size 601 determined by the Physical layer. As is illustrated in FIG. 7a, the aggregation of small data packets 700, 701 allows to optimally fill the allocated timeslot 302, thereby improving throughput capacity. On the other hand, FIG. 7b shows that if a small data packet 703 is not aggregated with other packets, the timeslot 302 cannot be optimally filled, and throughput capacity is lost.

Figure 8:
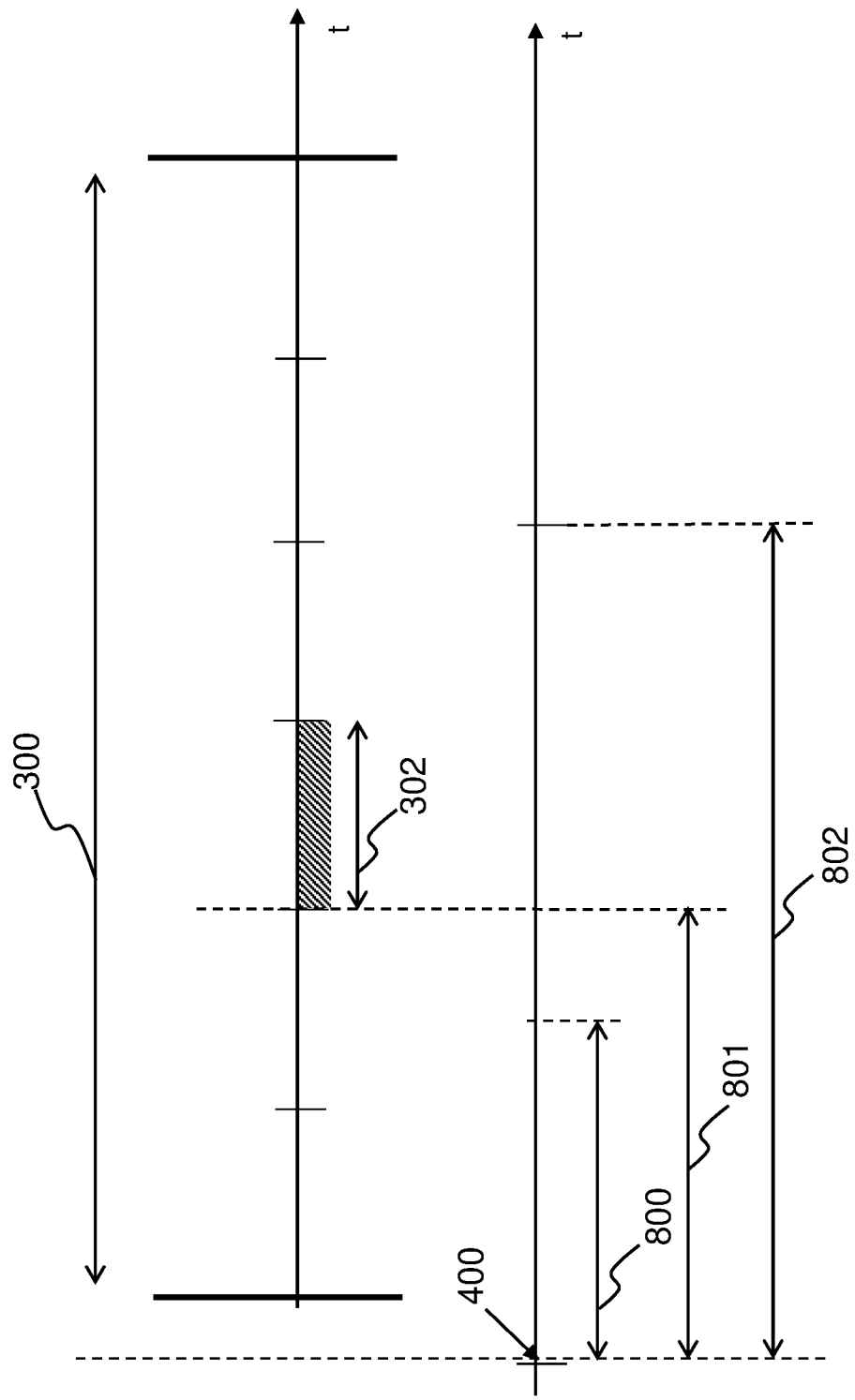
FIG. 8 and FIG. 9 illustrate the calculation of a maximal allowed delay before scheduling, according to an embodiment of the invention.

Pushing a small data packet 700 to an aggregation buffer implies that a delay is introduced before the data packet 700 is effectively scheduled, thereby introducing a risk that the latency constraint 210 of the data packet 700 will be violated. In an embodiment, illustrated in FIG. 8, a maximum allowed delay before scheduling 801 is calculated, and buffering of a small data packet 700 is only allowed if the maximum allowed delay 801 is larger than a predefined maximum buffer time 800. The predefined maximum buffer time 800 controls the maximum time that a packet 700 waits in the aggregation buffer. If this time expires, the packet 700 is scheduled, as a single data packet 700, or as an aggregated data packet already formed but with a maximal size not yet reached. In FIG. 8, the data packet 700 has a maximum allowed latency shown as the time duration 802. As is clear from the figure, the data packet 700 needs to be scheduled within timeslot 302 in order to be able to meet the latency requirement; postponing its transmission to a next superframe would lead to a violation of the latency requirement. Therefore, the maximum allowed delay before scheduling 801 is the time between time of birth 400 and the start of the timeslot 302; as soon as execution of the timeslot 302 has started, the data packet 700 cannot be scheduled in time anymore. In the case of FIG. 8 the maximum allowed delay 801 is larger than the predefined buffer time 800. Therefore, buffering a data packet 700, for a time not exceeding the predefined maximum buffer time 800, gives no risk of violating the latency requirement. Consequently, buffering the data packet 700 before scheduling is allowed.

Figure 9:
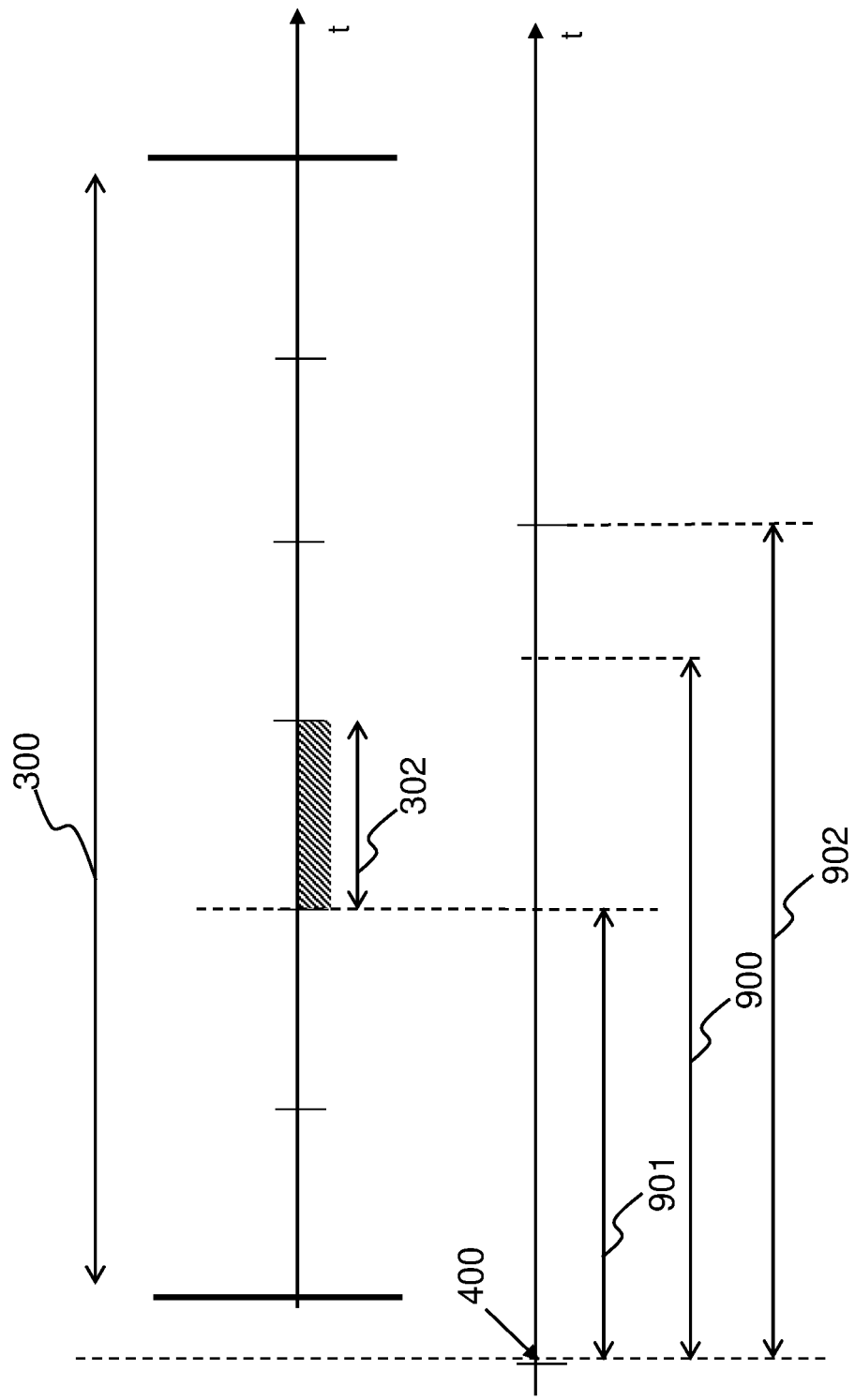

In FIG. 9, a case is illustrated where buffering is not allowed. Here, the data packet 703 has a maximally allowed latency 902, showing that the data packet 703 needs to be scheduled within the timeslot 302. As the maximum allowed delay before scheduling 901 is smaller than the predefined maximum buffer time 900, buffering of the data packet 703 is not allowed. Consequently, the data packet 703 is scheduled immediately, without waiting for possible aggregation partners first, as is illustrated in FIG. 7b. Scheduling a small data packet 703 without aggregation may occur if buffering is not allowed due to the latency requirement of the packet 703, or if the data packet 703 has been buffered for some time, but the maximum buffer time was exceeded before an aggregation partner was available.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A device for medium access control in a node of a wireless communication network with time-shared medium, comprising:
    a slot allocation module configured to allocate a timeslot for transmission of a data flow from said node to a destination node over said time-shared medium;
    a validation module configured to validate a data packet comprised in said data flow before transmission to said destination node based on:
        a latency requirement for said data packet, and
        an expected latency for said data packet based on the position in time of said timeslot, resulting in an approved data packet or a disapproved data packet;
    a scheduling module configured to schedule in said timeslot, a data packet comprised in said data flow and approved by said validation module, for transmission to said destination node, and
    wherein said device is configured to drop a data packet comprised in said data flow and disapproved by said validation module, such that said disapproved data packet is not transmitted to said destination node, and
    wherein said device is configured to receive a parent data packet from a higher layer, to segment said parent data packet into data packets of a predefined maximum size comprising said data packet, and to assign the same latency requirement to each of said data packets originating from said parent data packet.

2. The device according to claim 1, wherein said device comprises an interface configured to receive one or more requirements, comprising said latency requirement, from an application.

3. The device according to claim 1, wherein said validation module is configured to calculate said expected latency for said data packet based on the current lifetime of said data packet and the currently remaining time until start of said timeslot.

4. The device according to claim 3, wherein said latency requirement is a maximum allowed latency for said data packet and said validation module is configured to validate said data packet by comparing said expected latency with said maximum allowed latency, resulting in an approved data packet if said expected latency is smaller than said maximum allowed latency, and otherwise resulting in a disapproved data packet.

5. The device according to claim 1, wherein said validation module is configured to validate said data packet before retransmission based on the number of times said data packet was transmitted and a maximum allowed number of retransmissions for said data packet.

6. The device according to claim 5, wherein said maximum allowed number of retransmissions for said data packet is based on the number of timeslots allocated for said transmission from said node to said destination node and/or said latency requirement.

7. The device according to claim 2, wherein said requirements comprise a maximum allowed Packet Error Rate and said slot allocation module is configured to allocate an additional timeslot for said transmission from said node to said destination node based on said maximum allowed Packet Error Rate and a monitored Packet Error Rate for said transmission.

8. The device according to claim 1, wherein said slot allocation module is configured to allocate an additional timeslot for said transmission from said node to said destination node based on the results of said validation module when validating multiple data packets before transmission to said destination node.

9. The device according to claim 1, wherein said scheduling module is configured to sequence data packets comprised in said data flow and approved by said validation module, according to their respective latency requirements and/or expected latencies.

10. The device according to claim 1, wherein said validation module is configured to use said latency requirement and said position in time of said timeslot to calculate a maximum allowed delay before scheduling said data packet for transmission, and
    wherein said scheduling module is configured to buffer said data packet before scheduling for transmission if said maximum allowed delay is larger than a predefined maximum buffer time, and to aggregate said data packet with another data packet when scheduling for transmission in said timeslot.

11. The device according to claim 1, wherein said device is configured to drop all of said data packets originating from said parent data packet if validation of one of said data packets by said validation module results in a disapproved data packet.

12. A method for medium access control in a node of a wireless communication network with time-shared medium, comprising:
    allocating a timeslot for transmission of a data flow from said node to a destination node over said time-shared medium;
    validating a data packet comprised in said data flow before transmission to said destination node based on:
        a latency requirement for said data packet, and
        an expected latency for said data packet based on the position in time of said timeslot, resulting in an approved data packet or a disapproved data packet;
    scheduling in said timeslot, a data packet comprised in said data flow and being approved, for transmission to said destination node, and wherein a data packet comprised in said data flow and being disapproved, is dropped, such that said disapproved data packet is not transmitted to said destination node, and wherein said device is configured to receive a parent data packet from a higher layer, to segment said parent data packet into data packets of a predefined maximum size comprising said data packet, and to assign the same latency requirement to each of said data packets originating from said parent data packet.

13. A non-transitory computer-readable medium having instructions stored thereon, which, when executed by one or more processors of a computing system cause the one or more processors to perform at least the following:

allocating a timeslot for transmission of a data flow from said node to a destination node over said time-shared medium;

validating a data packet comprised in said data flow before transmission to said destination node based on:

a latency requirement for said data packet, and an expected latency for said data packet based on the position in time of said timeslot, resulting in an approved data packet or a disapproved data packet;

scheduling in said timeslot, a data packet comprised in said data flow and being approved, for transmission to said destination node, and wherein a data packet comprised in said data flow and being disapproved, is dropped, such that said disapproved data packet is not transmitted to said destination node, and wherein said device is configured to receive a parent data packet from a higher layer, to segment said parent data packet into data packets of a predefined maximum size comprising said data packet, and to assign the same latency requirement to each of said data packets originating from said parent data packet.

* * * * *